United States Patent [19]

Alfano et al.

[11] Patent Number: 4,972,423
[45] Date of Patent: Nov. 20, 1990

[54] METHOD AND APPARATUS FOR GENERATING ULTRASHORT LIGHT PULSES

[76] Inventors: Robert R. Alfano, 3777 Independence Ave., Bronx, N.Y. 10463; Peter J. Delfyett, 209-35 46th St., Queens, N.Y. 11361; Roger Dorsinville, 3915 Orloff Ave., #3C, Bronx, N.Y. 10463

[21] Appl. No.: 292,185

[22] Filed: Dec. 30, 1988

[51] Int. Cl.$^5$ .............................................. H01S 3/10
[52] U.S. Cl. ......................................... 372/25; 372/20
[58] Field of Search ................ 372/25, 18, 102, 20, 372/33, 69, 92, 93; 356/301

[56] References Cited

U.S. PATENT DOCUMENTS

| | | | |
|---|---|---|---|
| 3,873,825 | 3/1975 | Jones et al. | 372/102 |
| 4,349,907 | 9/1982 | Campillo et al. | 372/102 |
| 4,512,660 | 2/1986 | Goldberg | 356/301 |
| 4,612,641 | 9/1986 | Corkum | 372/25 |
| 4,685,107 | 8/1987 | Kafka et al. | 372/25 |
| 4,727,553 | 2/1988 | Fork et al. | 372/25 |
| 4,815,080 | 3/1989 | Chesnoy et al. | 372/25 |

Primary Examiner—Leon Scott, Jr.
Attorney, Agent, or Firm—Irving M. Kriegsman

[57] ABSTRACT

A method and apparatus for generating a light pulse having a duration as short as about 3 picoseconds is disclosed. A 5 mJ 25 picosecond second harmonic light pulse from a Nd:YAG laser system is focused into a 5 cm cell filled with $D_2O$ so as to generate a continuum light pulse spanning about 150 nanometers with an average energy of at least 20 nd/nm across the spectrum. The continuum light pulse is fed through a 10 nanometer narrowband filter centered at 580 nanometers, producing an output pulse having a duration of about 3 picoseconds. The pulse so produced has a number of uses including as a seed pulse for dye laser oscillators and solid state amplifiers or as a pump source for pumping ultrashort dye lasers.

13 Claims, 4 Drawing Sheets

METHOD AND APPARATUS FOR GENERATING ULTRASHORT LIGHT PULSES

BACKGROUND OF THE INVENTION

The present invention relates generally to a method and apparatus for generating ultrashort light pulses and more particularly to a method and apparatus for generating ultrashort light pulses which is based on self phase modulation (SPM).

High-power ultrashort laser light pulses propagating in a condensed medium can experience self-phase modulation (SPM) which can lead to the generation of a broadband light continuum. Recent theoretical analyses have concluded that the Stokes and anti-Stokes shifts should appear in the leading and trailing edge of the pump pulse, respectively. This result has been supported by experimental studies where the temporal location of various parts of the continuum was determined using the autocorrelation and streak camera methods in both the femtosecond and picosecond regimes.

In an article entitled Optical Pulse Narrowing By Spectral Windowing of Self Phase Modulated Picosecond Pulses by A. S. L. Gomes etc. appearing in Opt. Commun. 59, 399 (1986) there is disclosed a pulse compression technique based on the spectral temporal distribution of an SPM spectrally broadened pulse in a fiber. According to the article, since the Stokes and anti-Stokes shifts are proportional to the intensity gradients on the sides of the pulse, a window within the broadened spectral profile should eliminate the wings of the generated pulse where the high and low-frequency components are located. A threefold shortening of 80 ps pulses to 30 ps from a Nd:YAG laser broadened from 0.3 to 4 A after propagation through 125 m of optical fiber with a monochromator as a spectral window is described in the article.

In an article entitled Supercontinuum Pulse Generation and propogation in liquid Carbontebachloride by P. P. Ho etc. appl. Opt 26, 2700 (1987), there is described an experiment where the continuum generated in $CCl_4$ by a weakly focused 8 ps laser pulse was measured by a 2 ps resolution streak camera at several wavelengths. The continuum was found to have a shorter duration than the pump (6 ps) and to be generated over a local spatial domain in the liquid cell.

It is an object of this invention to provide a method and apparatus for generating ultrashort light pulses.

It is another object of this invention to provide an apparatus for generating ultrashort light pulses which is tunable.

SUMMARY OF THE INVENTION

A method of generating ultrashort light pulses according to the teachings of this invention comprises providing a mode locked laser, generating a broadband light continuum from the output of the mode locked laser and then selecting a spectral region from the broadband light continuum pulse so generated, the spectral region so selected having a duration less than that of the light pulse emitted from the mode locked laser.

An apparatus for generating an ultrafast light pulses according to the teachings of this invention comprises a mode locked laser, means for generating a broadband light continuum from the output of the mode locked laser and means for selecting a spectral region from the broadband continuum so generated, the spectral region so selected having a duration less than that of the light pulse emitted from the mode locked laser.

Various features and advantages will appear from the description to follow. In the description, reference is made to the accompanying drawings which forms a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

The present invention is directed to a method and apparatus for generating ultrashort laser light pulses. The technique of the invention involves providing a mode locked laser, generating a wideband continuum light pulse from the output of the mode locked laser and then selecting a spectral region from the wideband continuum light pulse so generated.

Figure 1:
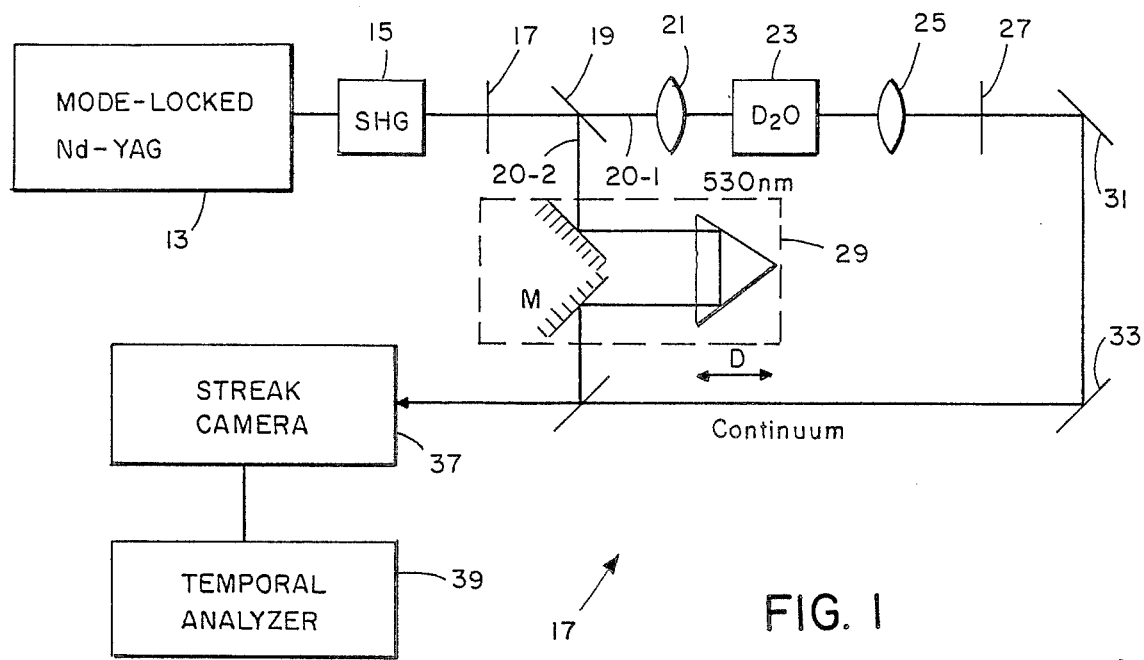
FIG. 1 is a schematic diagram of an experimental arrangement used to generate a continuum light pulse and measure its duration over a number of spectral regions, according to this invention.

Referring now to FIG. 1, there is shown an experimental arrangement 11 which was used to generate and measure an ultrashort light pulse according to this invention. The setup included an active and passively mode locked Nd:YAG laser 13. The output of laser 13, which was at 1060 nanometers (not visible) was fed into a KDP second harmonic generator (SHG) 15 to produce a 25 picosecond (tmj) second harmonic light pulse (visible at 530 nanometers). A filter 17 removed the fundamental from the output of SHG 15. The resulting second harmonic 25 psec (5 mj) laser pulse was divided by a 5% reflecting beam splitter 19 into two beams. The stronger beam (i.e. the beam traveling along path 20-1) was used to generate the continuum pulses. The weaker one (i.e. the beam traveling along path 20-2) was used as a prepulse to provide a relative time scale for the continuum pulse and to determine the pulse duration of the second harmonic pulse. The continuum was generated by focusing the second harmonic laser beam traveling along path 20-1 with a 20 cm focal length lens 21 into a 5 cm cell 23 filled with $D_2O$. The continuum pulse so produced spanned from 450 to 600 nm with a minimum average energy of at least 20 nJ/nm across the spectrum. The continuum pulse was collimated with a lens 25. Narrow band filters were inserted after lens 25 to select particular spectral regions within the continuum pulse. Measurements were made with 10 nm bandwidth filters at several wavelengths. In the FIG. 1 apparatus, one such filter is shown and identified by reference numeral 27. The prepulse was fed through an optical delay 29. The filtered portion of the continuum pulse was deflected off a pair of mirrors 31 and 33 and then combined with the delayed prepulse by optics 35. The combined pulse was directed into a Hamamatsu model C1587 streak camera 37. The image formed by the streak camera was analyzed by a temporal analyzer. The streak camera 37 was set at a 300 psec full sweep range. The minimum resolution of the streak camera was 2 psec. The temporal analyzer 39 included a video camera, an A/D converter and a computer.

Figure 2:
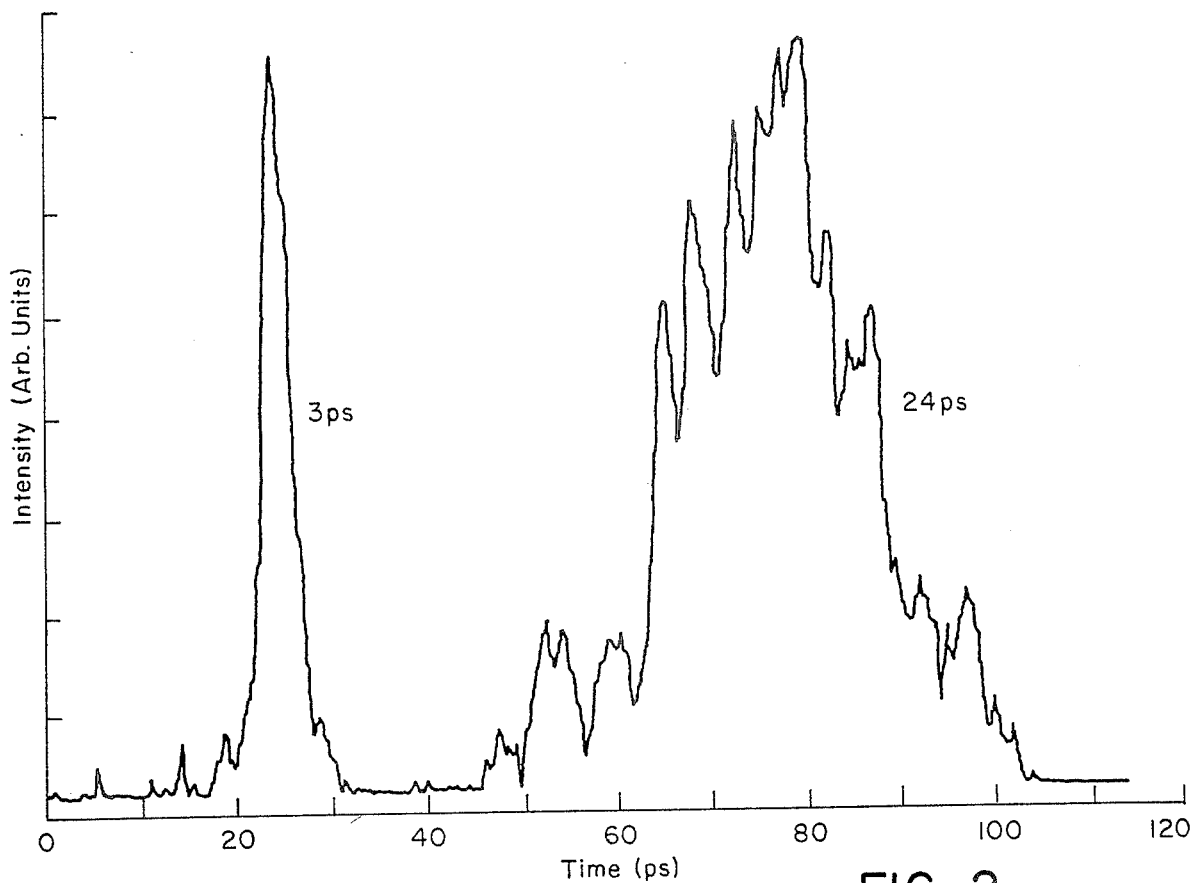
FIG. 2 is a temporal display of the second harmonic laser light pulse in the arrangement shown in FIG. 1 and a part of the continuum pulse selected by a 10 nanometer bandwidth narrow band filter centered at 580 nanometers.

FIG. 2 gives a temporal display of both the second harmonic laser pulse and the part of the continuum pulse selected by a 10 nm bandwidth narrowband filter 27 centered at 580 nm. in the setup in FIG. 1. As can be seen, the pulse duration at 530 nm is 24 psec, while the pulse derived from the continuum is clearly much shorter. The measured pulse duration (FWJM) is 3 psec and is almost limited by the resolution of the streak camera. From this, a minium compression ratio of 8 is achieved.

Figure 3:
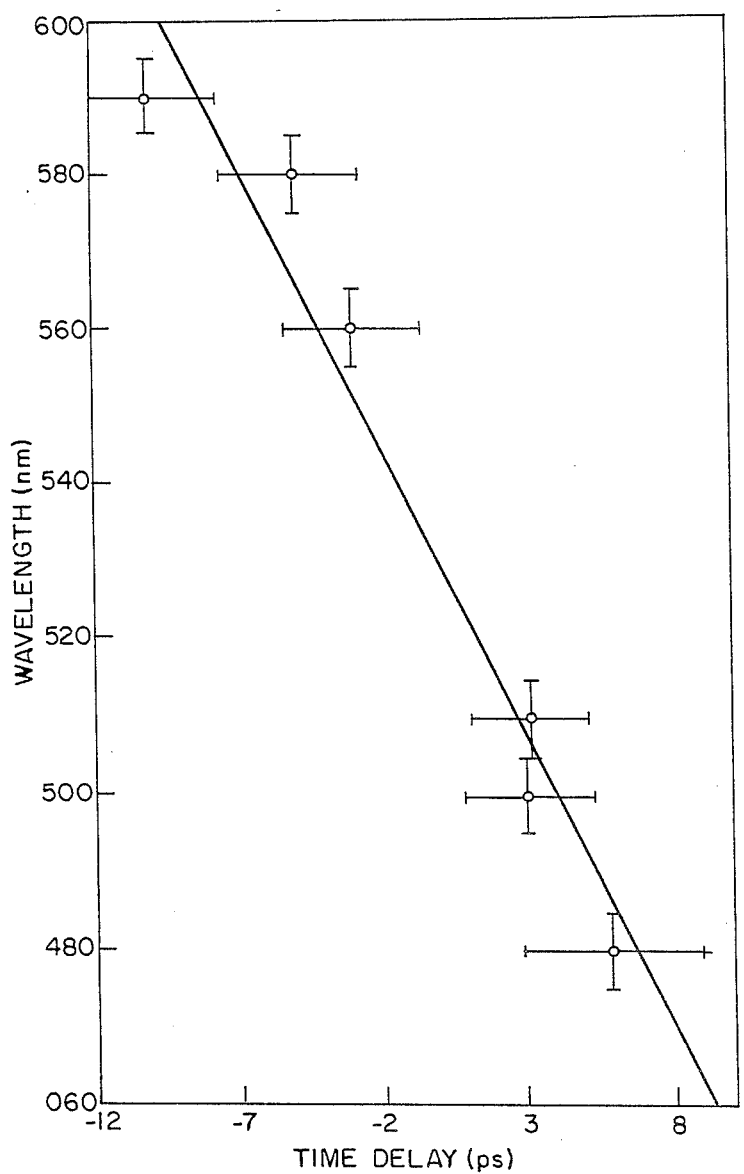
FIG. 3 is a graph of the temporal distribution of the continuum spectrum produced in the FIG. 1 arrangement.

The temporal distribution of the continuum spectrum was determined by measuring the time delay between the spectrally selected continuum pulse and a reference pulse. The results are shown in FIG. 3. The time delay was 22 psec for a 140 nm change in wavelength as predicted by the SPM mechanism. The Stokes wavelengths led the anti-Stokes wavelengths. The delay due to group velocity dispersion over a 5 cm $D_2O$ cell for the 140 nm wavelength change is 4 psec. The remaining 18 psec is well accounted by the SPM mechanism using a 25 psec (FWHM) pulse and the stationary phase methods. Furthermore, a 10 nm change in the temporal distribution curve corresponds to an approximately 2.6 psec width matching the measured pulse duration.

Figure 3A:
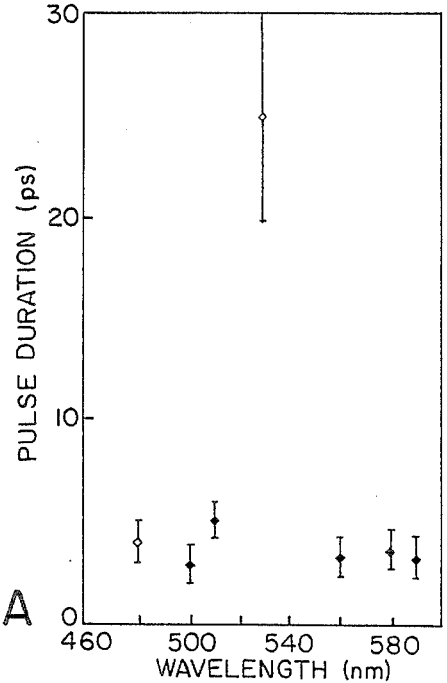
FIG. 3A is a plot of pulse duration vs peak transmission wavelength of several different narrow band filters used in the arrangement shown in FIG. 1.

In FIG. 3A the pulse duration is plotted as a function of the peak transmission wavelength of different narrowband filters which were used in the setup in FIG. 1. Each point on the curve is the average of at least six separate measurements. No deconvolution of data for the prompt 2 ps response was performed. The pulse durations were 4 ps except close to the pump laser wavelength (530 nm) where the signal pulse duration was equal to the input pulse duration (25 ps). This is expected since a very small portion (1%) of the laser energy is converted into continuum with such long input pulses, and the signal at 530 nm consisted mainly of the laser pulse.

Figure 4:
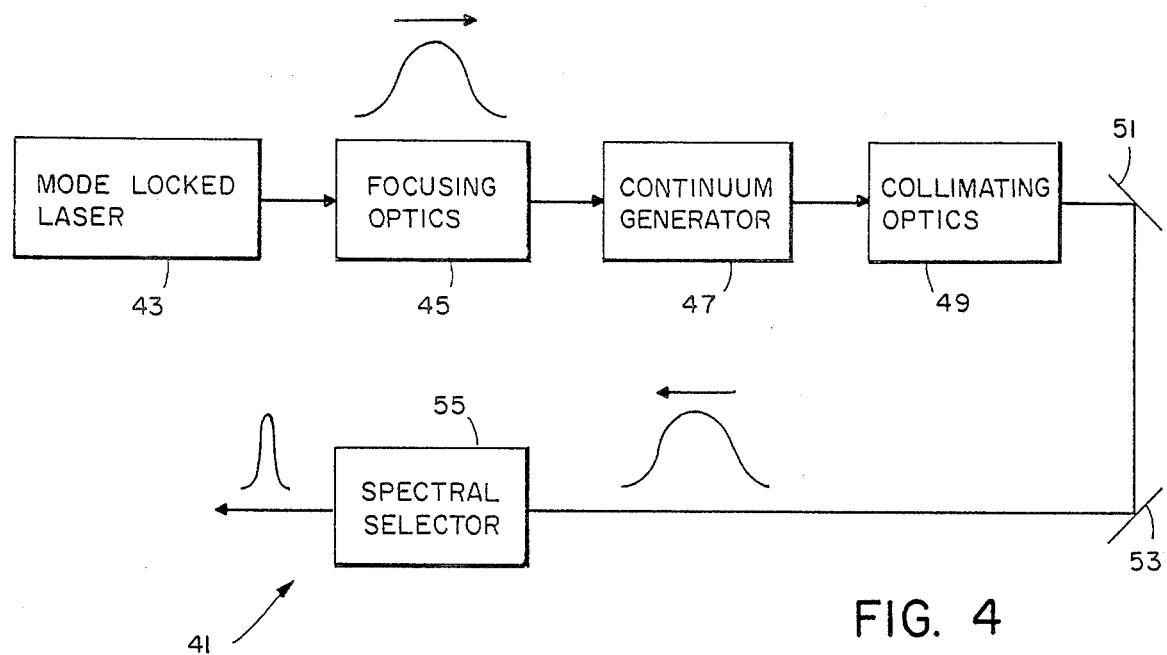
FIG. 4 is a block diagram of a system for generating ultrashort light pulses according to this invention.

Referring now to FIG. 4 there is shown a block diagram of a system 41 for generating ultrashort light pulses according to this invention.

System 41 includes a mode locked laser 43. Laser 43 may be a solid state type of mode locked laser such as a neodymium—YAG laser or a neodymium—glass laser or a dye laser type of mode locked laser such a rhodamine 6G dye laser. The output of mode locked laser 43 is focussed by optics 45 into a continuum generator 47. Continuum generator 47 is a quantity of a nonlinear material, solid or liquid, such as for example $H_2O$, $D_2O$, $CCl_4$ or glass. The intensity of the output of laser 43 and the dimensions of the linear medium are such that a broadband continuum is produced. The output of continuum generator 47 is collimated by optics 48, deflected off a pair of mirrors 51 and 53 and then fed into a spectral selector 55 where a spectral region within the continuum is selected and passed through. Spectral selector 55 may be a filter (or combination of filters) or a spectrometer or a grating. The output of spectral selector 55 is the output system 41.

As can be appreciated, by selecting narrow bandwidth regions in the continuum pulse, such as by using for example narrowband filters, ultrashort optical pulses can be generated. As is apparent, picosecond pulses of less than 2 ps can be generated by using an initial 30 psec laser pulse. Also, femtosecond laser pulses can be produced from picosecond laser pulses. Also, by appropriate spectral selection, pulses on the order of femtoseconds and approaching the uncertainty limit can be acieved. Since the spectral region selected can be changed, the apparatus is, in effect, a tunable source of ultrashort light pulses.

Figure 5:
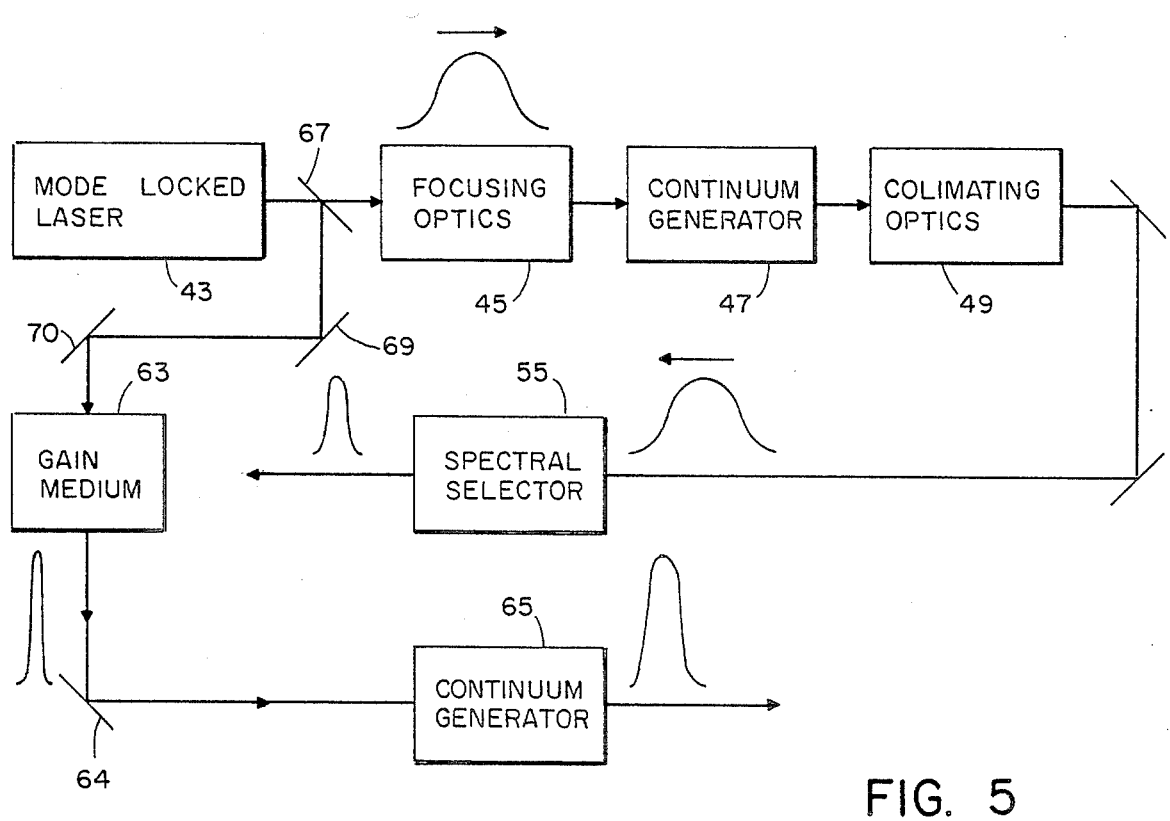
FIG. 5 is a block diagram of a system for generating ultrashort and amplified laser light pulses according to this invention.

In FIG. 5 there is shown another system 61 according to this invention. System 61 differs from system 41 in that the output pulse from spectral selector 55 is amplified by a gain medium 63 and then deflected off a mirror 64 passed through a second continuum generator 65 to make the output wider banded. Gain medium 63 may be a standard laser dye such as Rhodamine 6G. As can be seen, the output of mode locked laser 43 is directed onto a beamsplitter 67. The transmitted beam is fed into the continuum generator 47 while the reflected beam is deflected off a pair of mirrors 69 and 70 and used as a pump pulse to pump gain medium 63.

Figure 6:
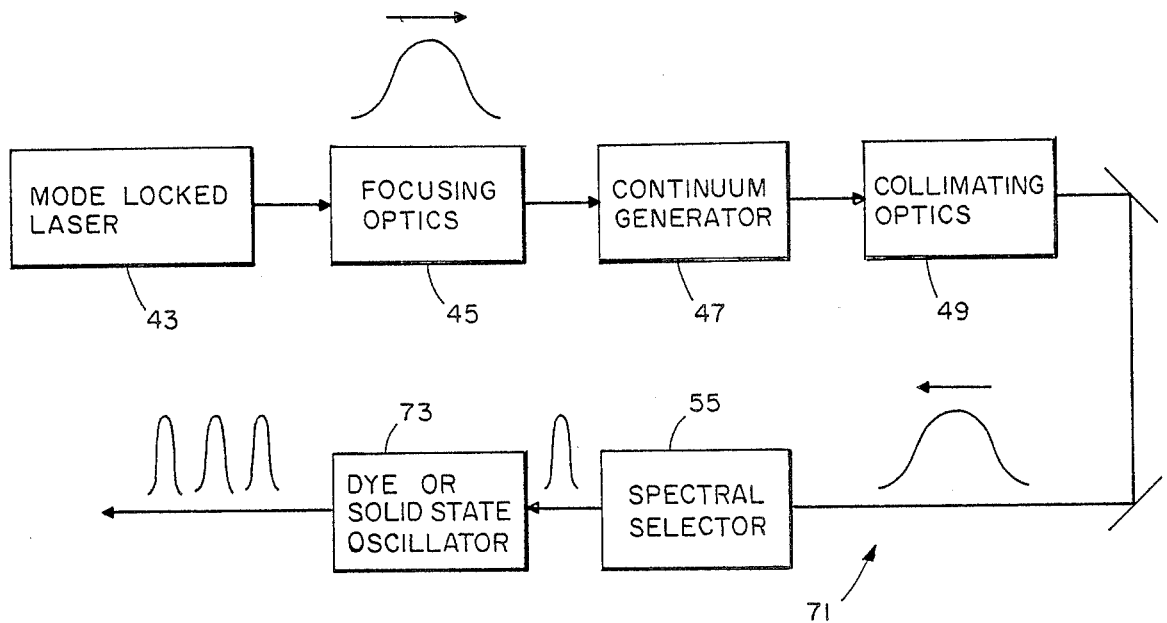
FIG. 6 is a block diagram of an oscillator system according to this invention.

In FIG. 6 there is shown a system 71 using ultrashort light pulses generated according to this invention in which the output of spectral selector 55 is deflected off a pair of mirrors 73 and 75 and then used as a seed pulse for a dye or solid state laser 77.

Figure 7:
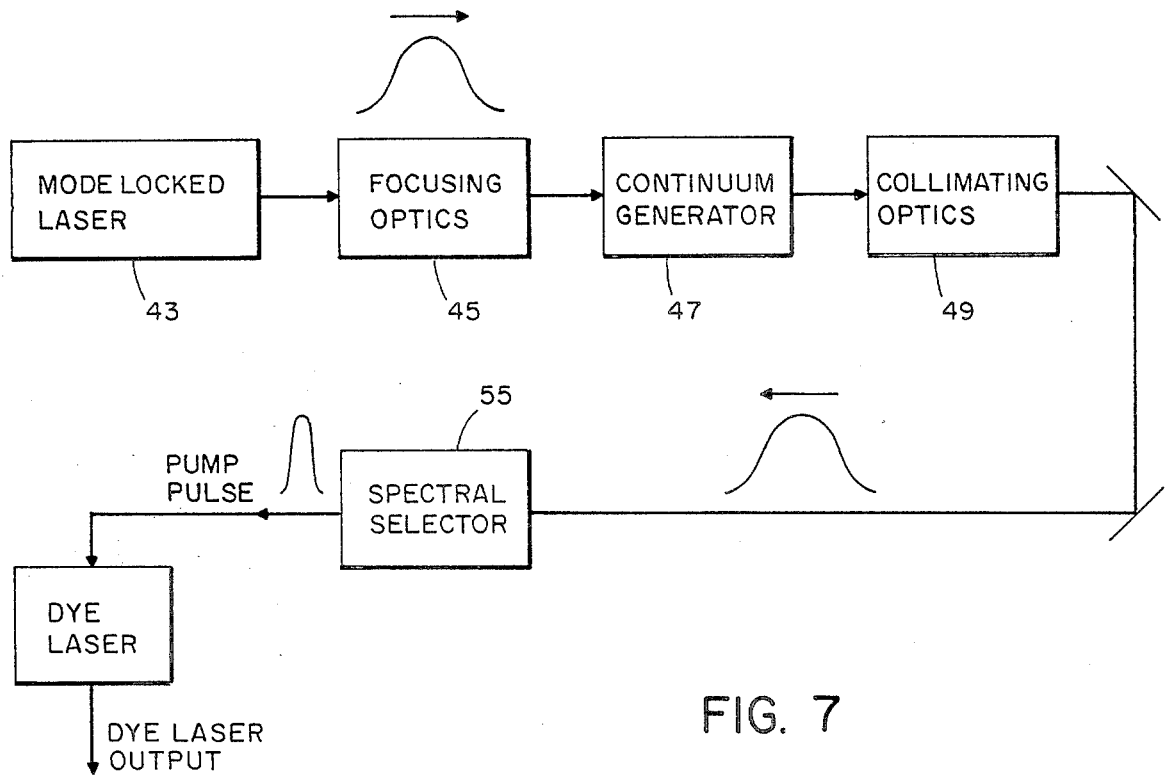
FIG. 7 is a block diagram of a laser system according to this invention.

In FIG. 7 there is shown a system 81 using ultrashort light pulses generated according to this invention in which the output pulses from spectral selector 55 is used as a pump source to pump a dye laser so as to produce tunable even shorter laser pulses.

The embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of generating a shortened ultrafast laser light pulse comprising:
   a. generating an ultrafast laser light pulse,
   b. generating a broadband light continuum pulse from the ultrafast laser light pulse, and then
   c. passing the broadband light continuum pulse through a tunable spectral selector, thereby producing a pulse within a selected region of the broadband light continuum pulse, resulting in a pulse constituting a shortened ultrafast laser light pulse.

2. The method of claim 1 and further including amplifying the resulting shortened ultrafast laser light pulse and then generating a broadband continuum pulse from the amplified resulting shortened ultrafast laser light pulse.

3. A method of shortening the duration of an ultrashort light pulse comprising:
   a. generating a broadband continuum light pulse from the ultrashort light pulse, the broadband continuum light pulse having a duration corresponding to that of the ultrashort light pulse, and then
   b. passing the broadband continuum light pulse through a tunable spectral selector wherein a pulse is produced corresponding to a selected spectral region of the broadband continuum pulse, said resulting pulse having a duration less than that of the ultrashort light pulse.

4. Apparatus for use in generating a shortened ultrafast laser light pulse comprising:
   a. means for generating an ultrafast laser light pulse,
   b. a continuum generator for generating a broadband light continuum pulse from the ultrafast laser light pulse, and
   c. tunable means for removing from the broadband continuum light pulse all frequencies except those over a preselected spectral region and producing as a result thereof a shortened ultrafast laser light pulse.

5. The apparatus of claim 4 and further including means for amplifying the shortened ultrafast laser light pulse and means for generating a broadband continuum from the amplified shortened ultrafast laser light pulse.

6. The apparatus of claim 4 and wherein the continuum generator comprises a nonlinear solid or a nonlinear liquid.

7. The apparatus of claim 4 and wherein the continuum generator is either $D_2O$ or glass or $CCl_4$.

8. The apparatus of claim 4 and wherein the tunable means includes a filter.

9. The apparatus of claim 4 and wherein the tunable means includes a grating.

10. The apparatus of claim 4 and wherein the tunable means includes a spectrometer.

11. The apparatus of claim 4 and wherein the means for generating an ultrafast laser light pulse comprises a mode locked laser.

12. The apparatus of claim 4 and wherein the tunable means includes a combination of filters.

13. Apparatus for producing a light pulse of about 3 picoseconds comprising:
   a. means for producing a pulse of light having a duration of about 25 picoseconds.
   b. means for generating a broadband continuum from the pulse of light, the broadband continuum spanning a region of about 150 nanometers, and
   c. tunable means for removing from the broadband continuum all frequencies except those over a preselected 10 nanometer spectral region, the pulse duration of the 10 nanometer spectral region being about 3 picoseconds.

* * * * *